Patented Apr. 19, 1932

1,854,363

UNITED STATES PATENT OFFICE

MAURICE AISEN, OF NEW YORK, N. Y.

DYE MATERIALS AND PROCESS FOR MAKING THE SAME

No Drawing.   Application filed January 6, 1926.   Serial No. 79,674.

This invention relates to dye materials and processes for making the same.

The object of my invention is to provide a dye material adapted for household or like purposes in a form that will make same available at exceedingly reduced cost, and in a handy and neat package which will embrace in one unit a large number of dyes and dyeing materials, bleaching or stripping materials.

Other objects of the invention will in part be obvious and in part hereinafter pointed out.

I accomplish these and other objects in a general way by providing a dye material in the form of a thin sheet which may be readily bound into a book or booklet form, and such that when a portion thereof is placed in water or other suitable solvent or vehicle, the dye material readily dissolves and a dye bath thus becomes immediately available for dyeing bleaching, or stripping, as the case may be.

In carrying out my invention, I take a thin sheet of material such as paper, for example, and impregnate or coat it with a dye, bleach or stripper, preferably in such manner that while the dye or other chemical will readily become dissolved when the treated paper is placed in the solvent, it will nevertheless remain impregnated in or fixed to the paper, and will not separate itself therefrom upon shaking, touch or friction applied by hand or otherwise.

The mixture is so prepared that it will not only become impregnated in or adhere to the sheet but will form a pliable, soluble layer thereon that will remain unaffected by external atmospheric conditions or handling.

For example, I have found the following process to give good results. I take the dye, stripper or bleacher, mix it with some adhesive substance, a softener and an inert earth or salt to serve as a suitable carrier for the dyestuff and other chemicals, and make the mixture up into a smooth paste. I then apply the paste to the paper or other sheet material, by hand or by means of a coating machine, the next pass the coated sheet over a heated calender or cylinder to dry the same.

For the dyestuff, any of the well known dyes such as vegetable dyes, basic dyes, acid dyes, direct or vat dyes, sulphur dyes, etc. may be employed. For the softener, some of the well known compounds or chemicals used for that purpose may be employed, such for example as Turkey red oil, or its saponified products, glycerine, glucose, mineral and vegetable oils and the like. Preferably a softener which will provide good levelling properties in the dye bath in addition to softening the coating or impregnating compound should be used. Turkey red oil or acetine, a compound of acetic acid and glycerine, I have found to well serve the purpose.

Any inert earth or salt may be employed, such for example as china, clay, kaolin, fixing clay, talc, barium sulphate and the like. Preferably I employ talc and barium sulphate because I found these to provide a very satisfactory soft coating or film on the sheet. For adhesive, a vegetable gum, such as gum arabic, British gum, dextrine and the like may be employed.

When applying this invention to provide a stripper or discharger, single or double salts of hydrosulphite may be employed, either in mineral or organic combination, as for example sodium hydrosulphite, potassium hydrosulphite, ammonium hydrosulphite, calcium hydrosulphite, or sodium formaldehyde hydrosulphite, or sulphoxylate.

For a bleacher, any convenient substance which gives off oxygen directly or indirectly may be employed, such as perborates, persulphates, percarbonates, perchlorates, peroxides, etc., all of these being well known bleaching agents.

An example showing the proportionate amount of the ingredients to be used in making up the impregnating or coating mixture and one which I have found to give good results is as follows:

2 parts by weight of the dyestuff;
2 parts by weight of an adhesive;
3 parts by weight of the carrier; and
1 part by weight of the softener material.

For increasing the dyeing efficiency of the sheet dyeing material, various reagents adapted to co-operate with the particular class of dye employed may be added to the mixture in forming the paste. Thus, if the dye chemical employed is basic or acid, a certain amount of acid may be introduced into the paste, as for example, tartaric acid, lactic and acetic. Where the chemical is a direct dye, phosphate of soda or any salt might be introduced which by hydrolysis will release the necessary alkali. These reagents may likewise be made up in sheet forms in similar manner to the sheet dye material.

Sheets of desired sizes might be made up in this way for a variety of colors, shades, or tints, and made up into rolls or bound in booklet form, for sale as a complete unit for household or similar use. Thus a housewife having such a booklet will have available to her any desired dye and would only need to tear out of the book a sheet or portion thereof of the desired color and dissolve the same in the required amount of water and thus provide a quick and effective dye bath. Various tints and shades of dye can be made by dissolving in the same bath predetermined portions of sheets of different colors taken from the booklet. Similarly stripper and bleaching sheets might be bound together with the dyeing sheets in the same booklet so that where it is desired first to rid the garment of any particular faded shade, a stripper sheet could be dissolved in the bath and first applied to the garment before dyeing. Likewise, where it is desired merely to bleach a garment, the bleaching sheet only may be dissolved before dyeing.

For facilitating the use of the sheet dye material, the sheet may be ruled into squares and each square be designated as the amount to be dissolved in a given amount of water, so that the housewife would experience no trouble or difficulty in providing the strength of dye required, and will further do so in a most economical manner without weighing or measuring. The size of the square and the corresponding amount of solution therefor may of course be determined in advance either mathematically or empirically depending upon the thickness of the coating on the sheet or the strength or quantity of the ingredients employed in making up the paste.

I have in the foregoing described several applications of my invention, but these as well as the particular material, the process and ingredients described are merely illustrative, and many variations will of course occur to one skilled in the art all within the scope of my invention.

Having thus described my invention, I claim as new and desire to secure by Letters Patent:—

1. The process of making a dye material comprising in mixing a dye chemical with a carrier, a softener and an adhesive substance and applying the mixture to a thin sheet.

2. The process of making a dye material comprising in mixing a dye chemical with a softener an adhesive substance and a carrier and spreading the same on a sheet to form a layer.

3. The process of making a dye material comprising in mixing a dye chemical with a softener, an adhesive substance and an inert earth and applying the mixture to a thin sheet.

4. A dye material comprising a thin sheet carrying a layer of a mixture of a dye, a softener, a carrier and an adhesive substance.

In testimony whereof I affix my signature.

MAURICE AISEN.